April 16, 1968  C. R. CAMENISCH  3,378,208
METHOD FOR ACCELERATED CURING OF TOBACCO
Filed Oct. 19, 1965  6 Sheets-Sheet 1
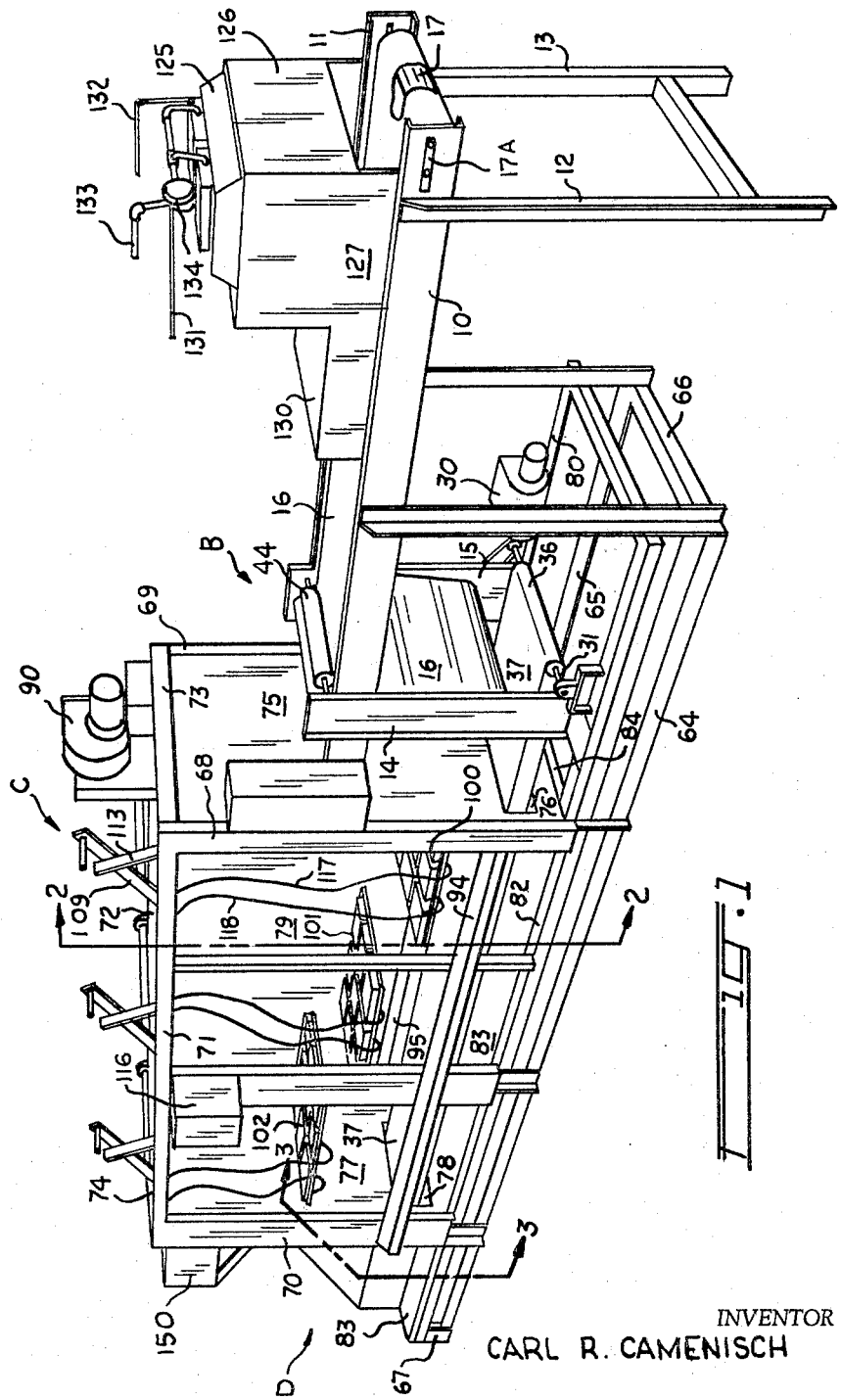
INVENTOR
CARL R. CAMENISCH
BY W. E. Sherwood
ATTORNEY April 16, 1968      C. R. CAMENISCH      3,378,208
METHOD FOR ACCELERATED CURING OF TOBACCO
Filed Oct. 19, 1965      6 Sheets-Sheet 2
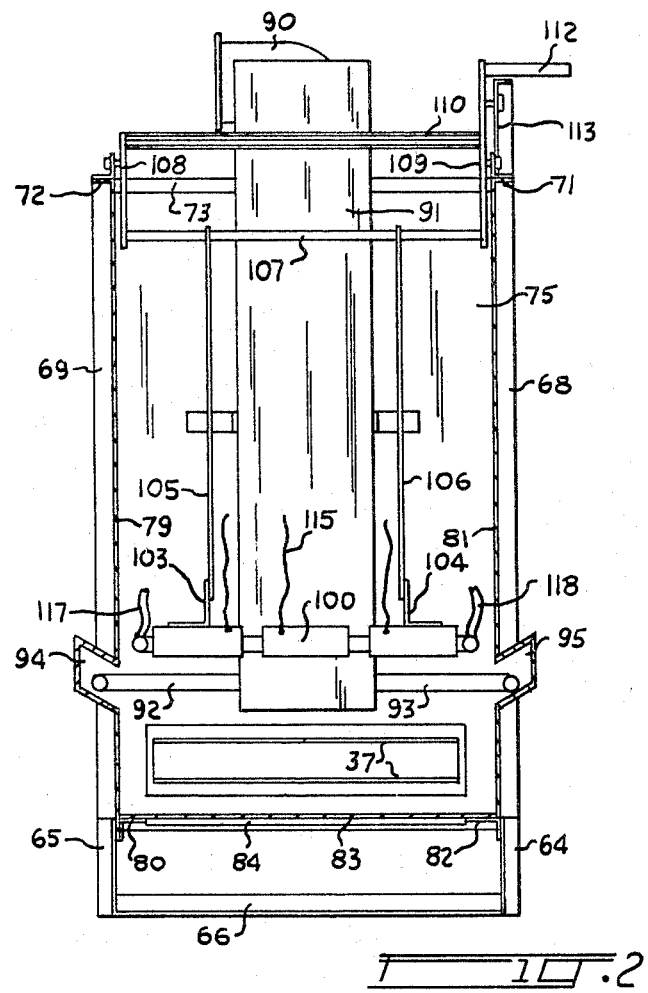
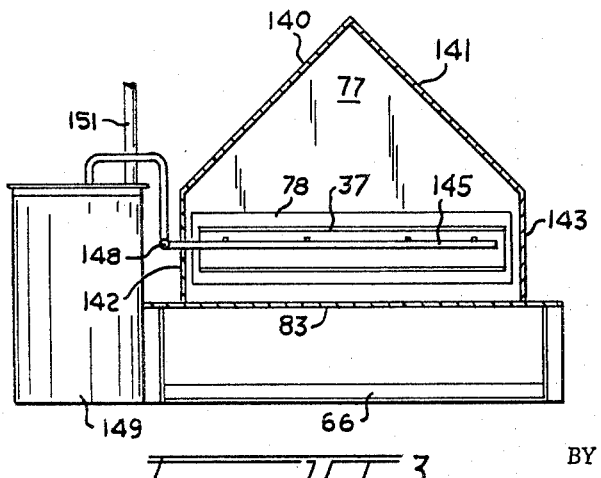
INVENTOR
CARL R. CAMENISCH
BY *W. E. Sherwood*
ATTORNEY April 16, 1968 C. R. CAMENISCH 3,378,208
METHOD FOR ACCELERATED CURING OF TOBACCO
Filed Oct. 19, 1965 6 Sheets-Sheet 3
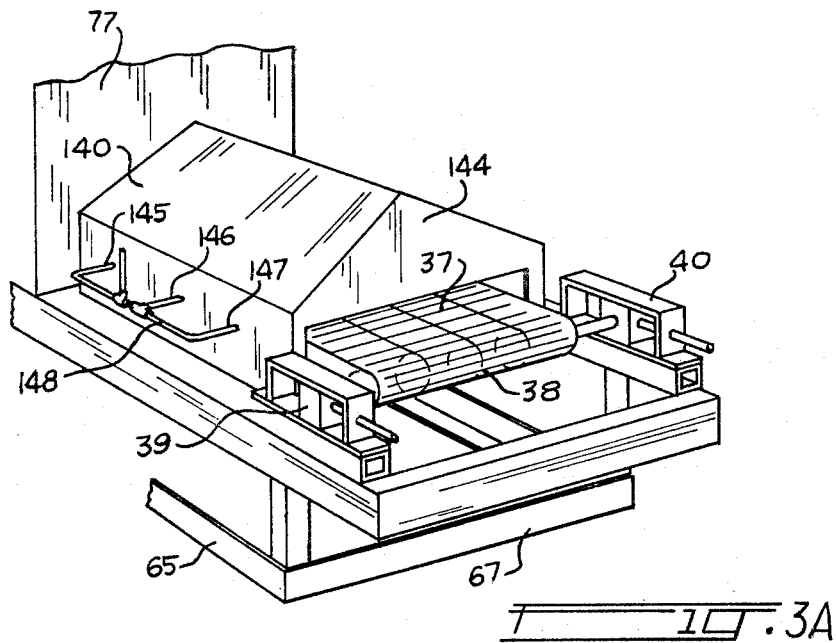
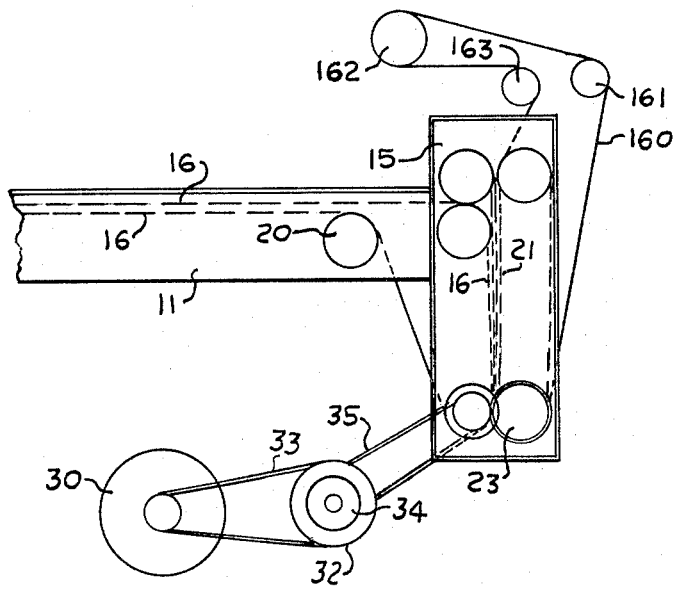
INVENTOR
CARL R. CAMENISCH
BY W. E. Sherwood
ATTORNEY

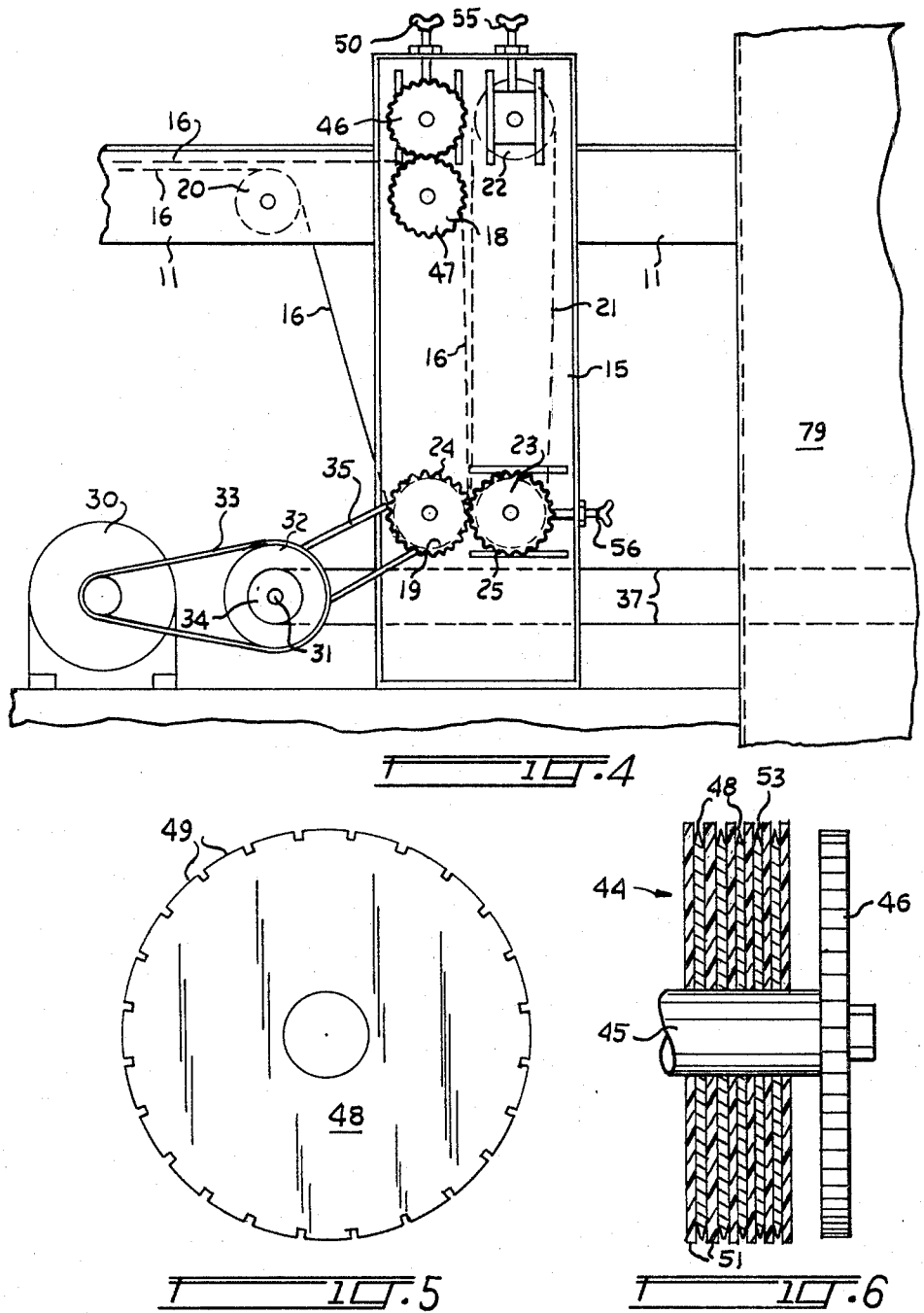

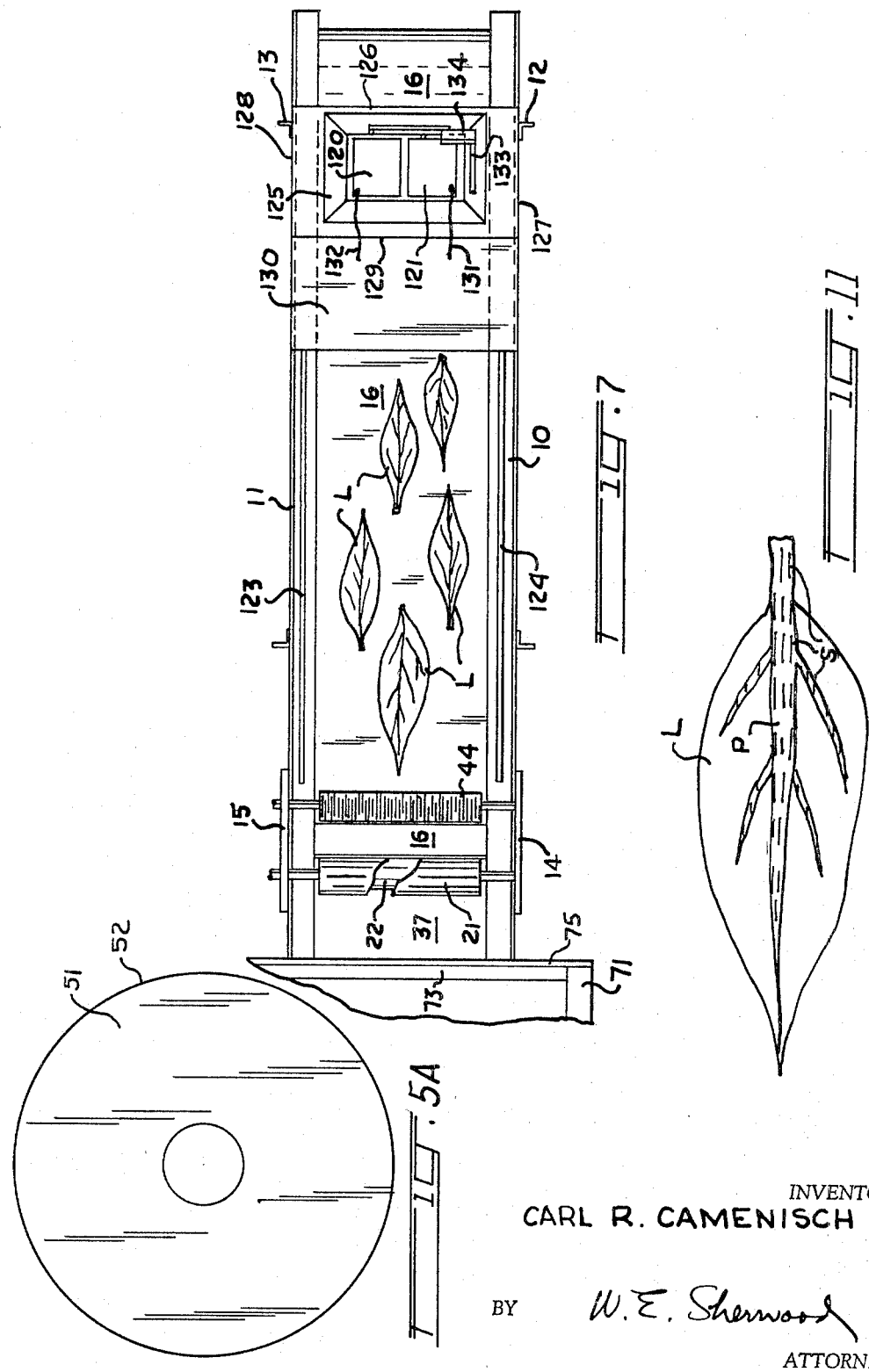

April 16, 1968   C. R. CAMENISCH   3,378,208
METHOD FOR ACCELERATED CURING OF TOBACCO
Filed Oct. 19, 1965   6 Sheets-Sheet 6
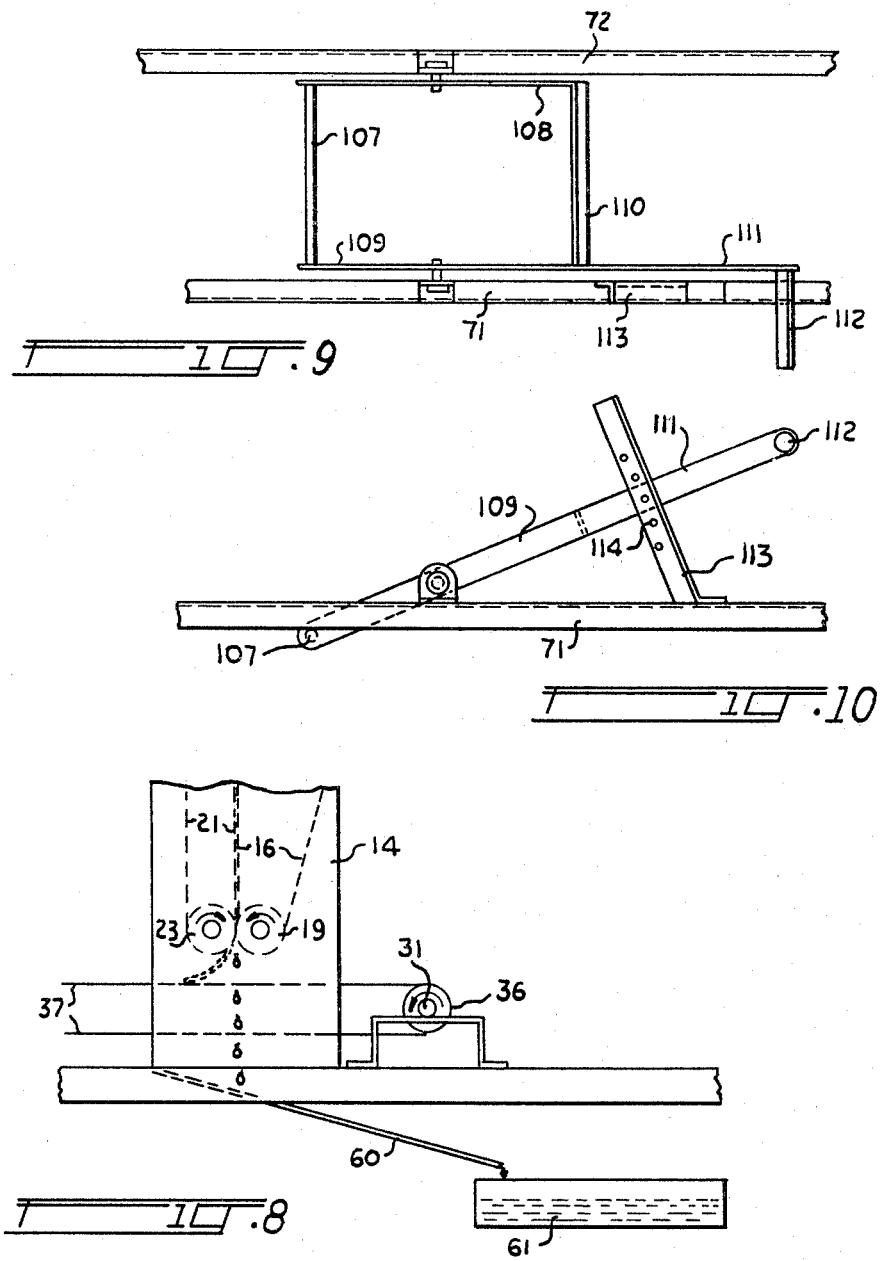
INVENTOR
CARL R. CAMENISCH
BY W. E. Sherwood
ATTORNEY

United States Patent Office 3,378,208
Patented Apr. 16, 1968

3,378,208
METHOD FOR ACCELERATED CURING
OF TOBACCO
Carl R. Camenisch, Prospect, Ky. 40059
Filed Oct. 19, 1965, Ser. No. 497,913
13 Claims. (Cl. 131—121)

The present invention relates to a method for curing of tobacco leaves detached from the stalk on which they were grown, and more particularly to a method in which the curing of the leaves is effected in a significantly shortened period of time and without impairment of the quality of the tobacco so cured.

Traditionally, the curing of tobacco has involved the practice of air curing, sun curing, or flue curing. More recently, a fourth practice known as bulk curing has been proposed. The particular curing method employed by the user depends generally upon factors such as type of tobacco, region of the country in which grown, available labor, availability of curing barns or structures, and overall economics involved in the handling of the tobacco from the growing plant in the field to the ultimate sale of the cured product. Each of the known curing methods has certain advantages and disadvantages as contrasted with each other, but one common disadvantage is the inordinate length of time required to cure the tobacco leaf.

A major distinction between this invention and curing processes of the above-mentioned nature resides in the exceptionally short period of time in which the leaf can be cured. Accordingly, the term, accelerated curing, is employed herein in the disclosure of the invention.

A large body of technical literature dealing with the physiology of the tobacco leaf has been developed and several theories as to the chemical changes occurring in the leaf as it is cured, have been advanced. The evidence, as a whole, indicates that the essential transformations taking place in the curing process; namely, removal of the green pigment and tartness common to all uncured tobacco, mellowing of the product, development of aroma, loss of gum, and darkening of color are of the same general character under all types of fermentation and aging though possibly varying in degree. In the example set forth hereinafter the comparative chemical analysis of tobacco cured in accordance with the present invention and by two conventional methods is disclosed.

As contrasted with the harvesting and curing of tobacco wherein the leaves remain on the severed stalk until curing is completed, this process normally involves the removal of the leaves from that stalk in the field and wherein such removal, or priming, takes place when the leaves have reached a maturity signified by a greater or lesser degree of yellowing of the leaf. The chemical changes which take place in a tobacco leaf during curing are similar to those occurring in the leaf during the ripening period in the field and appear essentially to constitute a starvation metabolism. At the latter phase of this starvation period the chlorophyll disintegrates into a yellow pigment which gives the characteristic yellow color to the leaf. Completion of the yellowing process usually marks the end of the starvation metabolism and the beginning of the second phase of curing which is indicated by the appearance of brown colors due to progressive oxidation of polyphenols, tannin-like substances, and coloring matter of the flavone type. The water content of the leaf at the beginning of the normal browning stage is very important in the further development of the color and of other curing changes.

In considering the drying of a tobacco leaf during curing, it will be understood that the web portion of the leaf comprises tiny cells which contain water as an integral part of their structure and that the fibrous stem contains water not only as an integral part of its cells, but also unbound water in its open porous regions. A typical drying-rate curve for such a leaf when subject to contact with hot air indicates that the initial drying which is associated chiefly with removal of moisture from the web takes place at a substantially constant rate and that the subsequent drying associated almost exclusively with removal of moisture from the stem by diffusion and by capillary action takes place at a progressively falling rate. These unequal drying rates of the web and stem portions of tobacco leaves have heretofore presented a major problem in the curing of tobacco and it is a purpose of this invention to overcome this problem in a novel manner, as will later appear.

In contrast with prior curing practices, the present invention is admirably suited to continuous movement of the tobacco leaf from the inlet end to the outlet end of the apparatus in which the curing is conducted. Moreover, the several stages through which the leaf is being continuously moved may each be conveniently regulated by conventional control means to the end that various types of tobacco at various degrees of ripeness may be processed with the same apparatus.

An object of the invention is to provide an accelerated method for curing tobacco leaves detached from the stalk on which they were grown.

Another object is to provide a method for curing tobacco leaves involving the continuous movement of the leaves through a curing apparatus.

Another object is to provide a method for the accelerated curing of tobacco leaves and in which the several steps of treatment are regulated by controls which are promptly responsive to variable demands required by the particular tobacco undergoing curing.

A further object is to provide an improved method for curing tobacco and involving a preliminary browning of the tobacco leaf web prior to removing moisture from the stem of the leaf.

A further object is to provide an improved method for curing tobacco and involving a substantially simultaneous final curing of the web and stem portions of the leaf.

Still a further object is to provide a method for collecting a liquid by-product from the stems of tobacco leaves during the curing of the leaves.

Other objects and advantages of the invention will become apparent as the description proceeds and when considered in conjunction with the accompanying drawings in which:

FIG. 1 is a perspective view, with parts broken away and with one side wall of the curing compartment removed, showing one form of apparatus in which the method of the invention may be practiced, and with portions of the heater assemblies being omitted in the interest of clarity of the drawing.

FIG. 2 is a transverse cross-sectional view taken on line 2—2 of FIG. 1 and to a larger scale.

FIG. 3 is a transverse cross-sectional view taken on line 3—3 of FIG. 1 and to a larger scale.

FIG. 3A is a perspective view of the discharge end of the curing conveyor.

FIG. 4 is a side elevation view showing the drive means for the conveyors and serrating roll.

FIG. 4A is a schematic view showing a modified form of apparatus employing an absorbent belt.

FIG. 5 is a view of the side face of a serrating disc.

FIG. 5A is a view of the side face of a leaf-ejection disc.

FIG. 6 is a detail view of the drive end portion of the serrating roll.

FIG. 7 is a top plan view of the inlet conveyor and associated structure with parts broken away.

FIG. 8 is a detail view showing the transfer station for the pressed leaf between the upper conveyors and the curing conveyor, and indicating one means for collection of moisture from the serrated stem.

FIG. 9 is a top plan view of the mounting for the primary heat sources.

FIG. 10 is a side elevation view of the mounting for the primary heat sources, and FIG. 11 is a plan view of a leaf subsequent to its passage under the serrating roll.

As will be understood, the method of the present invention may be carried out in various forms of apparatus and is not to be considered as limited to use with the particular apparatus which is shown herein for an illustrative, rather than a limiting purpose. However, an apparatus of the general type as shown is preferred, and such is more fully disclosed and is claimed in copending application Serial No. 543,128 filed April 18, 1966 and assigned to the same assignee as the present invention.

As will be apparent to those skilled in the art, the present method is directed essentially to the curing of tobacco leaves which have been removed from the stalk a sufficient time to be wilted and flexible. In contrast with known methods and apparatus for drying tobacco; for ordering of the same; or for other treatments of tobacco which already has been cured, this invention is concerned with curing of leaves having a substantial amount of their original moisture still present therein. With the foregoing in mind, and referring now to FIG. 1 the tobacco leaf which is to be handled in the accelerated curing method preferably is passed continuously and in sequence through a preheating stage indicated generally at A, a stem-moisture extraction stage indicated generally at B, a web-and-stem drying stage indicated generally at C, and a moistening or ordering stage indicated generally at D. The length of time for passage of the leaf from the inlet to outlet of the apparatus depends to some extent upon the particular tobacco being handled, but generally will be not more than five minutes and in some cases may be no longer than one minute.

Surprisingly, it has been found that the simultaneous final curing of the web and stem portions of the leaf may be achieved at satisfactory drying rate, and resulting in an improved final tobacco product, when the leaf entering stage C has first had a substantial portion of the liquid in its stem mechanically extraced therefrom, and preferably has received a preliminary browning treatment prior to entering stage B.

The method of the invention may be practiced with an apparatus of the type shown generally in FIG. 1 and in which an elevated framework comprising a pair of generally horizontal side rails 10 and 11 are supported adjacent their forward ends by legs 12 and 13, and adjacent their rearward ends by generally vertical side uprights 14 and 15 of a roll stand. An imput conveyor which conveniently may comprise an endless Teflon belt or polyvinyl chloride coated fabric belt 16, passes over a roll 17 at the entrance end of the side rails, passes over an idler roll 18 (FIG. 4) mounted between the uprights of the roll stand, downwardly and around a driven roll 19 mounted between the uprights, upwardly over an idler roll 20 mounted between the side rails, and thence back to roll 17. A suitable tensioning means 17A is provided to adjust the position of roll 17 and thereby to regulate the tension maintained on belt 16. Cooperating with the input conveyor and preferably driven in timed unison therewith is a transfer conveyor which conveniently may be of the same material as the input conveyor and which comprises an endless belt 21 arranged generally vertically and passing over an upper roll 22 and a lower roll 23 mounted between the uprights 14 and 15. The exterior end of the shaft which mounts roll 19 has keyed thereto a gear 24 which meshes with a gear 25 carried by the exterior end of the shaft which mounts roll 23.

As a significant feature, a variable speed motor 30, which may be controlled from one or more locations at which the performance of the apparatus is being observed during the curing of the tobacco, drives a head shaft 31 by means of a pulley 32 and belt 33. A second pulley 34 on this shaft drives a pulley mounted on roll 19 through a second belt 35. Head shaft 31 carries a roll 36 over which is trained in driven engagement therewith an elongated perforate, screen-like curing conveyor 37 mounted generally horizontally and extending completely through the curing compartment, later to be described. As best shown in FIG. 3A the conveyor 37 which is flexible and preferably is of a metallic construction is trained over a tail shaft 38 which is adapted to be adjusted by tensioning means 39, 40 so as to maintain the proper tension on the conveyor and to compensate for expansion or contraction of the same.

As an important feature of the invention, the step of serrating the stem of the tobacco leaf is related to the rate of travel of the leaf along the above-described conveyors, and one means for so serrating the stem is shown in FIGS. 5 to 7. This includes a composite serrating roll 44 including a shaft 45 having a gear 46 keyed to its outer end and meshing with gear 47 keyed to the roll 18. Mounted in spaced relation upon shaft 45 and about 1/16 inch apart is an array of thin annular serrating discs 48 having spaced teeth 49 on their peripheries and which are adapted to bite into the stem of the tobacco leaf as it is carried by the upper flight of conveyor 16 into contact with the serrating roll. The shaft of roll 44 may be adjusted by conventional means 50 so as to insure that appropriate depth of stem serrating takes place when different sizes or types of tobacco leaves are to be treated, it being understood, however, that the teeth 49 normally will not touch the web portion of the leaf even when the serrating roll is lowered to its maximum extent. Moreover, in order to prevent the teeth 49 from embedding in the stem and wrapping the leaf around the roll 44, each side of each of the serrating discs is in close contact with the confronting sides of an array of thin annular leaf-ejection discs 51 which are formed preferably of a suitable material, such as neoprene, having an appropriate modulus of elasticity. The outside diameter of the leaf-ejection discs is about 1/16 inch greater than the outside diameter of the serrating discs, and the peripheral edge 52 of the leaf-ejection discs is of uniform diameter whereas the periphery 53 of the serrating disc has a knife edge. As the stem of the leaf is squeezed between belt 16 and the serrating roll 44, the contacting edge of the disc 51 deform and permit the teeth 49 to cut into the stem, but when the leaf is carried beyond this point the restoring force in the material of discs 51 then acts to push the stem out of contact with these teeth.

Considering now FIGS. 4 and 7, it will be noted that the upstream end of curing conveyor 37 is located upstream from and beneath drive roll 19 with the result that a leaf dropping from the cooperating conveyors 16 and 21 is deposited upon the curing conveyor preparatory to its passage through the curing compartment. The location of the respective axes of rolls 18, 19, 22 and 23 is such that the conveyor belts 16 and 21 are spaced apart in the region where the serrated-stem leaf starts its downward movement and are in pressing contact with each other adjacent the plane of travel of the curing conveyor. In order to provide the proper degree of pressing contact, conventional tensioning means 55 and 56 are provided for adjusting the axes of the rolls 22 and 23 of the transfer conveyor. This feature serves a useful purpose in that it provides for the efficient extraction of moisture from the serrated stem of the tobacco leaf and makes possible the production of a useful by-product of the curing method. As best shown in FIG. 8, an inclined drain plate 60 is provided beneath the curing conveyor 37 and drops of moisture pressed from the stems of the leaves fall upon that plate and are directed into a storage receptacle 61. This liquid is rich in nicotine and other compounds useful for various purposes. As will be apparent, as the liquid is being collected the leaf L touches the top flight of conveyor 37 and is thereupon conveyed into the curing compartment now to be described. Moreover, since the speed of the conveyor 37 is the same as the speed of conveyors 16 and 21 as a result of the above-described drive arrangement, that leaf is not pulled apart as a result of its movement from the pressing conveyors to the curing conveyor.

As best shown in FIGS. 1 and 2, an open-top elongated curing compartment is arranged at stage C of the treatment and comprises a generally rectangular framework having a lower side beams 64 and 65 with transverse end beams 66, 67. Vertical corner posts, three of which are shown at 68, 69, 70, serve to support elevated side rails 71, 72 which are joined at their ends by cross rails 73, 74. An end wall 75 having a suitable opening 76 therein for passage of conveyor 37 therethrough is supported between posts 68 and 69 and at the outlet end of the curing compartment a similar end wall 77 having an opening 78 therein is mounted between the corresponding posts. An imperforate side wall 79 is fixed to side rail 72 and to the corresponding corner posts and extends downwardly to a lower side rail 80 to which it is affixed at its lower edge. In addition an imperforate side wall 81 (FIG. 2) is removably attached to side rail 71 and to corner posts 68, 70 and extends downwardly to a lower side rail 82 which it is affixed at its lower edge. An imperforate floor plate 83 is attached at its forward end to a lower cross rail 84, to the side rails 80, 82, and extends beyond the end wall 77 to form a floor for the ordering apparatus at stage D, and as later to be described. This floor is located several inches below the path of travel of the lower flight of conveyor 37. Each of the walls and the floor are formed of a metallic material having an efficient heat reflectivity value.

Mounted at any convenient location is a motor driven blower 90 which forces air into a duct 91 which preferably is disposed adjacent the inner surface of front wall 75 and which has lateral conduits 92, 93 extending therefrom. These conduits feed into manifolds 94 and 95 extending longitudinally of the compartment and having a plurality of spaced openings entering into the interior of the compartment and preferably located above the plane of travel of the upper flight of conveyor 37. Such openings are equipped with suitably controlled dampers (not shown) for regulating the relative quantities of air blown into the compartment at the several openings.

The openings are arranged to discharge the air in such a manner as to avoid interference with the normal functioning of the burners of the several heating assemblies and to avoid disturbing the position of the leaves on the conveyor 37.

As a significant feature of the invention, it has been discovered that the curing of the tobacco leaves may be accomplished most satisfactorily by use of heaters which emit infrared or far red radiation. Accordingly, there is provided for use in the above-described curing compartment, a series of heater assemblies disposed longitudinally of the compartment and as indicated generally at 100, 101, and 102. Each of these assemblies includes a plurality, for example, four, of burners elements of the type more fully disclosed in the United States Patent No. 2,775,294 to Gunther Schwank. As best shown in FIG. 2, each of the heater asemblies is mounted for selective adjustment vertically with respect to the tobacco passing therebelow on conveyor 37, and includes a plurality of brackets supporting the burner assembly, and two of which brackets are indicated at 103, 104. Attached to the brackets are wires 105, 106 which are affixed at their upper ends to a cross rod 107 of an adjusting frame mounted adjacent the open top of the curing compartment. As seen in FIGS. 9 and 10 this frame includes side bars 108, 109 pivotally arranged on the rails 72 and 71 and joined by a second cross bar 110 to provide rigidity. Side bar 109 is provided with an extension 111 from which projects a handle 112 affording easy manipulation from the exterior of the compartment. A fixed bracket 113 is mounted upon rail 71 and provided with openings 114 into which a detent (not shown) carried by extension 111 may engage in order to hold the heater assembly at the selected height above conveyor 37.

Connected to each of the burner elements in each heater assembly are flexible conductors as indicated at 115 leading to a conventional igniter control box 116 mounted upon the framework of the compartment. Likewise, connected to each burner element is its respective flexible fuel supply conduit leading to a source of gaseous fuel and provided with its individual valve means, all of which is conventional. Two such fuel supply conduits are indicated generally at 117, 118.

As will later appear, the heater assemblies thus far described serve the purpose of curing a tobacco leaf which already preferably has received a preheating treatment and a concomitant initial browning. As shown in FIGS. 1 and 7 this preheating may be obtained by means of a separate heater assembly including a pair of burner elements 120 and 121 of the Schwenk type and mounted at the top of an enclosure which has wheels (not shown) adapted for travel along parallel rails 123, 124 disposed on the top surfaces of the side rails 10 and 11 of the elevated framework. The enclosure includes hood portion 125, a front wall 126, side walls 127, 128 and a rear wall 129. Projecting rearwardly from the rear wall is a cover plate 130 serving as the top boundary for the open rearward end of the enclosure and located in substantially the same plane as the lower edge of the front wall 126. Flexible conductors 131 and 132, with sufficient length to accommodate movement of the enclosure, lead from igniter control box 116 to the respective burner elements. In addition, a flexible conduit 133 of appropriate length leads from a supply source of gaseous fuel to a control valve 134 carried by the enclosure and through which valve the regulated amount of fuel is supplied to the respective burner elements 120 and 121.

Referring now to FIGS. 3 and 3A, at the output end of the curing compartment the cured tobacco passes through the ordering stage D. A suitable apparatus for this purpose may comprise a hood having imperforate top sections 140, 141 joined at one end to the rear wall 77 of the curing compartment and joined at the sides to vertical walls 142, 143 which in turn are joined at their bottom edges to the floor plate 83 projecting from that compartment.

A rear wall 144 having an aperture of sufficient size to accommodate the conveyor 37 and the tobacco leaves resting thereon serves to complete the hood structure. Extending through wall 142 is a plurality of pipes 145, 146, 147 joined to a header pipe 148 which in turn is connected to a suitable steam generator or boiler 149. This boiler may receive water from an elevated reservoir 150 through supply conduit 151 and may be heated by any suitable means. Each of pipes 145, 146, 147 extend beneath the upper flight and above the lower flight of conveyor 37 and have upwardly directed nozzles through which steam is ejected to form a suitable ordering environment within the hood. The thus described hood is accordingly substantially filled with steam and as the hot and dry tobacco enters the same through aperture 78 in wall 77 it is immediately subjected to controllable moistening or ordering which bring it "in case" and which inhibits shattering or breakage of the leaf as it drops or is picked from the discharge end of conveyor 37. Normally, the moisture content of the leaf upon leaving the ordering stage D is about 8–12% by weight.

The subsequent treatment accorded the tobacco after it is discharged from the ordering stage D forms no part of the present invention. Moreover, the construction and mounting of the curing conveyor 37, apart from the driving of the same in conjunction with the drive of its associated conveyors by means of the variable speed drive means 30, forms no part of the invention and may be of any conventional nature. As used herein, the term 'serrating' is intended to comprise various ways of opening the surface of the leaf stem to permit moisture to escape, and thus slitting, puncturing, perforating or the like are included in the term.

THE CURING METHOD

The present method of curing is in no way limited to any particular type or sub-type of tobacco grown either in the United States or in other countries. It is, however, limited to the treating of tobacco leaves which have been detached from the stalk on which they were grown, and to leaves which have attained a sufficient maturity to provide an end product having physical and chemical characteristics commensurate with those expected in the market place. Such characteristics include, but are not limited to, the factors of aroma, grain, taste, elasticity, keeping quality, and general soundness. In the following description of the method steps a Burley type of tobacco is taken as an example.

When the tobacco on the stalk has matured to the point at which a definite yellowing has occurred, the yellowed leaves are detached and after a suitable wilting period has elapsed, the leaves may then be placed in spaced relation upon the inlet end of the moving conveyor belt 16. The speed of this belt may be varied but in general the leaf is suitably preheated when raised to a temperature of not less than about 100° F. or not more than about 130° F., and preferably between 110° F. and 125° F., as it is moved through the preheating enclosure. The time during which the tobacco remains at this temperature is not less than about 5 seconds nor more than about 30 seconds, and preferably between 6 and 15 seconds.

Due to the short length of time in which the leaf is so preheated, and to the fact that its stem is not serrated, no substantial drying of the leaf occurs in this preheating stage.

The leaves may be placed upon the belt 16 either with their tip ends or their butt ends foremost and are exposed to the direct heat radiation from the infrared burner elements 120, 121.

Immediately upon receiving this, preheating the web or lamina portion of the leaf begins to turn brown even though no significant amount of drying of the leaf has yet occurred. The extent of such browning permitted to occur before the curing step takes place in the curing compartment may be governed by moving the preheating enclosure to various positions along the rails of the framework, the greater the distance of such enclosure from the serrating roll 44 the greater will be the amount of such browning for a given speed of belt 16 and for a given preheating temperature.

As will be evident, the method is not limited to the treatment of tobacco leaves having their stems present, but on the contrary may in its broader aspects be used with destemmed leaves. However, as now to be described it is assumed that the preheated leaves L (FIG. 7) approaching the serrating roll 44 contain their stems. The leaf-ejection discs of that roll clear the belt 16 by a sufficient amount, for example, about 1/16-inch, to enable the web portion of the leaf to pass under the roll without crushing, but both the leaf-ejection discs 51 and the serrating discs 48 contact the stem of the leaves. The teeth 49 of the discs 48 accordingly, impress upon the stem a pattern of parallel rows of slits S (FIG. 11) as the leaf L is passed into contact with transfer conveyor 21 but the web portion of the leaf which has received its initial browning is not damaged. It will be noted, moreover, that the intermediate stem fibre portions P both longitudinally and transversely of the slits S remain connected to each other, thus to retain in the processed leaf a certain measure of tensile strength in the stem thereof.

As shown in FIG. 4 when the leaves pass beyond roll 44 they are carried downwardly between the converging belts 16 and 21 and a moisture extraction occurs as the serrated stem is squeezed between those belts. This moisture normally falls as discrete drops from the lower end of the roll stand and is collected separately. Use of Teflon belts to which moisture does not adhere, is recommended. When it is desired to effect a removal of the moisture squeezed from the stem and adhering to the normal underside of the leaf, rather than to collect moisture separately, a modified apparatus as indicated in FIG. 4A may be used. In this arrangement an endless belt 160 of a suitable absorbent material may be trained over the roll 23 between the confronting surfaces of belts 16 and 21 and then pass over suitable idler rolls 161, 162 and 163. This belt 160 preferably is driven by the contact with the other moving belts although a separate drive could be employed.

As will now be apparent, in the practice of the method, leaves which are deposited upon the curing conveyor 37 now have a brownish tinged lamina, have a stem from which a major portion of the moisture has been extracted, and will not have been dried in the conventional sense of that term. All of this, moreover, preferably has occurred in less than a minute from the time such leaves were placed on belt 16. Immediately upon reaching conveyor 37 the pretreated leaves move into the curing compartment and are subjected to the heating influence of the first infrared heating assembly 100.

The height of this assembly above the leaves as well as the heights of the assemblies 101 and 102 and the longitudinal spacing of the assemblies may be widely varied without departing from the invention. Merely as an example, a height of about 13–18 inches from the radiating surface of assembly 100 to the upper flight of conveyor 37 has given good results with a conveyor speed of about 12 feet per minute. The application of the curing heat to the tobacco includes not only the direct radiation from the infrared burners, but also a transfer of heat by convection currents of air, and this heating takes place at atmospheric pressure. Heat, moreover, is reflected from the metallic floor 83 and the metallic side walls 79, 81 and the leaves thus receive heat on both sides thereof. Since the curing compartment has an open top, the products of combustion from the burners are carried upward by the air supplied from manifolds 94 and 95 and moisture liberated from the drying leaf is removed from the apparatus by means of this air stream.

Due to the prior removal of a large amount of the moisture from the stem of the leaf, the conventional large descrepancy between the drying rates for the lamina and stems of the leaves no longer exists, and the application of heat to the leaves passing through the compartment can be accelerated as compared with conventional heating practices. As a significant feature of this invention, the leaf is progressively brought to a temperature preferably of not less than about 210° F. and not more than about 220° F. by the time it reaches the opening 78 in the rear wall 77 of the compartment. In the treatment of Burley tobacco, moreover, it is found that the brown color imparted to the leaf by the preheating treatment lightens to a somewhat tan color as the leaf is dried to these temperatures. The totally unexpected phenomena associated with this preheating treatment is not fully understood, but it appears that when the leaf receives a preliminary browning action prior to extraction of the moisture from the stem, the customary mottled yellow and brown color found in a leaf dried without preheating will not be present. Moreover, the chemical nature of the leaf cured by the present process appears to be superior to that found in conventional air-cured tobacco.

For example, the comparative chemical analysis of Burley tobacco varieties K–35 and Hybrid 401 cured by the present method and by two conventional air curing practices is summarized in the following table.

TABLE I

| | Variety: K-35 | | | | | | Variety: Hybrid 401 | | | | | |
|---|---|---|---|---|---|---|---|---|---|---|---|---|
| | Sample A, Conventional Stalk Air Cured | | Sample F, Primed Air Cured | | Sample E, Primed Accelerated Cured | | Sample C, Conventional Stalk Air Cured | | Sample B, Primed Air Cured | | Sample D, Primed Accelerated Cured | |
| | As received, percent | Dry Basis, percent | As received, percent | Dry Basis, percent | As received, percent | Dry Basis, percent | As received, percent | Dry Basis, percent | As received, percent | Dry Basis, percent | As received, percent | Dry Basis, percent |
| Moisture | 13.57 | 0.00 | 17.66 | 0.00 | 13.20 | 0.00 | 13.22 | 0.00 | 15.43 | 0.00 | 10.47 | 0.00 |
| Nitrogen | 4.75 | 5.50 | 4.02 | 4.88 | 3.68 | 4.24 | 3.82 | 4.40 | 3.52 | 4.16 | 3.70 | 4.13 |
| Ammonia | 5.78 | 6.69 | 4.89 | 5.94 | 4.47 | 5.15 | 4.65 | 5.36 | 4.28 | 5.06 | 4.50 | 5.03 |
| Ethyl Ether Extract (TAR) | 8.80 | 10.18 | 7.50 | 9.11 | 9.30 | 10.71 | 9.12 | 10.51 | 9.00 | 10.64 | 8.80 | 9.83 |
| Ash | 13.41 | 15.52 | 14.22 | 17.26 | 14.34 | 16.52 | 15.77 | 18.17 | 16.47 | 19.47 | 15.66 | 17.53 |
| Total Sugar as Invert | Trace | Trace | Trace | Trace | Trace | Trace | Trace | Trace | Trace | Trace | Trace | Trace |
| Total Alkaloids as Nicotine | 4.36 | 5.04 | 3.89 | 4.72 | 3.48 | 4.01 | 3.80 | 4.38 | 3.03 | 3.58 | 3.48 | 8.89 |
| Secondary Amine Alkaloids as Nornicotine | 0.81 | 0.94 | 0.87 | 1.06 | 0.52 | 0.60 | 0.61 | 0.70 | 0.45 | 0.53 | 0.71 | 0.79 |
| Total Volatile Bases as Ammonia | 0.89 | 1.03 | 0.86 | 1.04 | 0.68 | 0.78 | 0.80 | 0.92 | 0.79 | 0.93 | 0.82 | 0.92 |
| Percent Nicotine as Ammonia | 0.46 | 0.53 | 0.41 | 0.50 | 0.37 | 0.43 | 0.40 | 0.46 | 0.32 | 0.38 | 0.37 | 0.41 |
| Total Volatile Bases Minus Nicotine | 0.43 | 0.50 | 0.45 | 0.54 | 0.31 | 0.35 | 0.40 | 0.46 | 0.47 | 0.55 | 0.45 | 0.51 |
| Ratio—Percent Nicotine as Ammonia/Total Volatile Bases as Ammonia | 0.52 | | 0.48 | | 0.54 | | 0.50 | | 0.41 | | 0.45 | |

Upon being discharged from the curing compartment the leaves are dry and fragile and require an ordering so as to be handleable. This step of the continuous method takes place in the enclosure best shown in FIG. 3A. The fog environment provided therein enables the entire leaf to take up moisture rapidly and by the time it reaches the discharge end of the conveyor 37 its moisture content on a weight basis is normally about 8 to 12%.

The length of the curing compartment, as well as the number of heating assemblies employed therein, the speed of the curing conveyor, the apportioning of the air flow from manifolds 94 and 95 lengthwise of the compartment, and the length of the ordering enclosure, may be modified as desired for use with different types of tobacco to be treated. In any event, however, it is contemplated that best curing results will be obtained when the elapsed time of travel of the leaf from the beginning of its treatment by this method to the end of the same does not exceed five minutes.

The curing method lends itself to prompt response as when a different supply of tobacco leaves is to be processed. Merely by a simple control of the variable speed motor 30 the speed of the conveyors may be modified, merely by moving the preheating enclosure along its rails the degree of browning prior to curing can be changed, and merely by adjusting the heights of the heating assemblies in the curing compartment, or by modifying a damper setting in the air supply, the degree of drying of the leaves can be regulated.

Having thus described the invention and having illustrated certain typical usages of the same, it will be apparent to those skilled in the art that various changes and modifications may be made therein without departing from true spirit and scope thereof. It, therefore, is intended to cover such modifications and changes within the following claims and to consider the invention as being limited only as defined in those claims.

What is claimed is:

1. The method of curing tobacco leaves detached from the stalk comprising, preheating the leaf and thereby effecting a browning of the web portion of the same, serrating the stem portion only of the browned leaf, pressing moisture from the serrated stem, and thereafter promptly applying heat to the leaf and curing the same.

2. The method of claim 1 wherein said leaf is preheated by directing infrared rays upon said leaf.

3. The method of claim 1 wherein said leaf is preheated to a temperature of not less than about 100° F. and not more than about 130° F. prior to serrating the stem.

4. The method of claim 3 wherein said preheating at said temperatures is concluded in not less than about 5 seconds nor more than about 30 seconds.

5. The method of claim 1 wherein said leaf acquires a temperature of not less than about 210° F. and not more than about 220° F. during the application of said curing heat thereto.

6. The method of continuously treating tobacco leaves detached from the stalk comprising, applying heat to the leaf while simultaneously moving the same through a preheating stage and thereby effecting a browning of the leaf, serrating the stem portion only of the browned leaf while continuing movement of the same, pressing moisture from the serrated stem while continuing movement of the leaf, and thereafter promptly applying heat to the leaf and pressed stem while continuing movement of the same thereby to effect curing of the stem and web portions of the leaf substantially, simultaneously.

7. The method of claim 6 including subjecting the cured leaf to contact with moisture while continuing movement of the leaf thereby to order the cured leaf for subsequent handling.

8. In a method for curing tobacco leaves detached from a stalk the steps comprising, preheating the uncured leaf and thereby effecting a browning of the web portion thereof, promptly thereafter serrating the stem portion only of the browned leaf by forming therein an array of parallel rows of slits spaced from each other longitudinally and transversely along the axis of said stem, and promptly thereafter mechanically extracting moisture from said serrated stem.

9. A method as defined in claim 8 wherein the step of serrating the stem, leaves a substantial amount of interconnected fiber intermediate the respective slits thereby to leave a residual tensile strength in the stem following its curing.

10. A method as defined in claim 8 wherein said mechanical extracting includes pressing the serrated stem and collecting as a separate by-product the moisture pressed therefrom.

11. The method of curing tobacco leaves detached from the stalk comprising, preheating the leaf and thereby effecting a browning of the web portion thereof, serrating the stem of the browned leaf, pressing moisture from the serrated stem portion only and removing said moisture from contact with the leaf, passing the thus treated leaf through a curing stage in which the stem and web portions are dried substantially simultaneously, and thereafter removing the cured leaf from said curing stage.

12. The method as defined in claim 11 wherein said leaf is dried by exposure to infrared radiation and in the presence of a moving body of air.

13. The method of claim 12 wherein said drying is conducted at substantially atmospheric pressure.

References Cited

UNITED STATES PATENTS

| | | | |
|---|---|---|---|
| 772,892 | 10/1904 | Lauhoff | 131—16 |
| 1,122,747 | 12/1914 | Hammerstein | 131—147 |
| 1,401,438 | 12/1921 | Pells | 131—147 |
| 1,447,075 | 2/1923 | Gutman | 131—147 |
| 1,547,428 | 7/1925 | Long | 131—147 |
| 1,754,117 | 4/1930 | Pacini | 131—121 |
| 1,813,833 | 7/1931 | Andrews | 131—121 |
| 1,926,036 | 9/1933 | Chesley | 131—121 |
| 2,446,822 | 8/1948 | Grapp | 34—17 |
| 2,519,304 | 8/1950 | Whitley | 146—119 |
| 3,145,716 | 8/1964 | Geitz et al. | 131—133 |

ALDRICH F. MEDBERY, *Primary Examiner.*